United States Patent [19]

Perrey et al.

[11] 4,140,665
[45] Feb. 20, 1979

[54] COAGULATING A POLYMER DISPERSION IN THE PRESENCE OF A HEAT SENSITIZING AGENT

[75] Inventors: Hermann Perrey, Krefeld; Martin Matner, Odenthal; Gustav Sinn, Leverkusen, all of Fed. Rep. of Germany

[73] Assignee: Bayer Aktiengesellschaft, Leverkusen, Fed. Rep. of Germany

[21] Appl. No.: 676,486

[22] Filed: Apr. 13, 1976

[30] Foreign Application Priority Data

Apr. 17, 1975 [DE] Fed. Rep. of Germany ....... 2516979

[51] Int. Cl.² .......................... C08L 23/00; C08L 7/02
[52] U.S. Cl. ...................... 260/29.6 NR; 260/29.6 N; 260/29.6 XA; 260/29.6 HN; 260/29.6 MN; 260/29.6 ME; 260/29.7 N; 260/29.7 E; 260/29.7 NR; 260/739; 260/815

[58] Field of Search ................. 260/29.6 N, 26.6 MN, 260/29.7 N, 29.6 NR, 29.6 ME, 29.9 E, 739, 815

[56] References Cited

U.S. PATENT DOCUMENTS

| 3,484,394 | 12/1969 | Holdstack ........................ 260/29.6 N |
| 3,714,101 | 1/1973 | Knechtges et al. ......... 260/29.6 MN |
| 3,878,152 | 4/1975 | Distler et al. ............... 260/29.6 MN |
| 4,053,440 | 10/1977 | Bonnet et al. ............... 260/29.6 MN |

*Primary Examiner*—Harold D. Anderson
*Attorney, Agent, or Firm*—Connolly and Hutz

[57] ABSTRACT

Method for coagulating polymer dispersions with heat sensitizing agents which contain specific urethane groups. These new heat sensitizing agents provide at room temperature stable latices which coagulate completely when heated.

6 Claims, No Drawings

COAGULATING A POLYMER DISPERSION IN THE PRESENCE OF A HEAT SENSITIZING AGENT

The invention relates to new heat sensitizing agents for the coagulation of polymer dispersions, in which either natural or synthetic latices or secondary dispersions can be used.

A number of heat sensitising agents are described in German Auslegeschrift No. 2,226,269, e.g., polyvinyl alkylether, water soluble polyacetals, oxalkylated polysiloxanes, cation active substances and oxalkylated amines. However, these compounds have many disadvantages. The disadvantageous properties of the polyvinyl alkylethers, the water soluble polyacetals, the oxalkylated polysiloxanes and of the cationic substances are set out in lines 35–53, column 1 of German Auslegeschrift No. 2,226,269. But the use of the oxalkylated amines described in the Auslegeschrift is greatly restricted by the necessity of adjusting a specific pH-value.

The object of the present invention is to device heat sensitizing agents which do not exhibit these disadvantages and which when used at room temperature provide extraordinarily stable latices which coagulate quickly and completely at higher temperatures.

Heat sensitizing agents containing specific urethane groups fulfill all requirements.

The invention therefore relates to heat sensitising agents of the general formula (I)

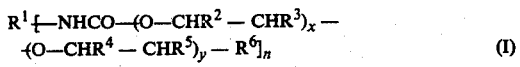
(I)

where

R$^1$ represents an optionally substituted alkyl, cycloalkyl or aryl radical, as remains after the removal of n isocyanate groups from a corresponding n-valent isocyanate;
n is a number from 1 to 20;
R$^2$ to R$^5$ represent independently of one another hydrogen, C$_1$–C$_4$-alkyl, phenyl or chloromethyl;
x stands for the numbers 1 to 100
y stands for the numbers 0 to 50 and
R$^6$ represents O-aryl, O-aralkyl, O-alkaryl, O—CO-alkyl, O—CO-aryl, NH—CO-alkyl, NH—SO$_2$-alkyl or O-alkyl.

Suitable alkyl radicals R$^1$ are those having 1 to 18 C-atoms. Suitable cycloalkyl radicals R$^1$ are those having 5 or 6 C-atoms in the nucleus; suitable aryl radicals are phenyl and naphthyl radicals whereby the radicals mentioned may contain, for example, urethane, urea, uretdion, biuret or isocyanuric acid radicals. The aryl radicals and cycloalcyl radicals preferably carry C$_1$–C$_4$-alkyl or chlorine substituents.

In the formula (I) mentioned
n preferably represents from 3 to 10
x preferably represents from 5 to 50 and
y preferably represents from 0 to 20.

Suitable O-alkyl, —NHCO-alkyl, —NHSO$_2$-alkyl and —OCO-alkyl radicals R$^6$ are those having from 1 to 30 preferably 8 to 20 C-atoms in the alkyl radical.

The aryl radicals mentioned in connection with R$^6$ are preferably phenyl and naphthyl radicals, which may be substituted by C$_1$–C$_4$-alkyl, chlorine, C$_1$–C$_4$-alkoxy and hydroxy etc.

Suitable O-aralkyl or O-alkaryl radicals R$^6$ have preferably from 6 to 15 C-atoms in the alkyl radical.

Heat sensitizing agents of formula (I), the use of which is particularly preferred, correspond to the formula (II):

(II)

where

R$^1$ represents one or more urea and/or biuret radical containing alkyl radicals or optionally cycloalkyl or aryl radicals substituted with methyl groups, such as remain after the removal of n isocyanate groups from a corresponding n-valent isocyanate;
n is a number from 3 to 10;
R$^2$ represents hydrogen or methyl;
x stands for the numbers 5 to 50 and
R$^6$ represents O-alkyl, O—CO-alkyl in each case with from 8 to 20 C-atoms in the alkyl radical or O-phenylalkyl with from 6 to 15 C-atoms in the alkyl radical.

The heat sensitizing agents according to the invention are partly known from U.S. Pat. Nos. 2,695,913 and 2,946,767 or can be produced by conventional processes known to every skilled man by the reaction of free or masked compounds containing isocyanate groups with monohydroxy compounds.

Suitable compounds containing aliphatic, cycloaliphatic and aromatic isocyanate groups include:
phenylisocyanate, methylisocyanate, cyclohexylisocyanate, stearylisocyanate, hexamethylenediisocyanate, cyclohexane-1, 4-diisocyanate, 2,4- and 2,6-toluylenediisocyanate and mixtures thereof, isophorondiisocyanate (1-isocyanatomethyl-5-isocyanato-1,3,3-trimethyl-cyclohexane), phorondiisocyanate, (2,2,4 or 2,4,4-trimethyl-hexamethylene-diisocyanate-1,6), 1,5-naphthalenediisocyanate, 1,3-cyclopentylene-diisocyanate m- and p-phenylene-diisocyanate, 2,4,6-toluylene-triisocyanate, 4,4',4"-triphenylmethane-triisocyanate, 1,3 and 1,4 xylylenediisocyanate, 3,3'-dimethyl-4,4'di-phenylmethanediisocyanate, 4,4'-diphenyl-methanediisocyanate, 3,3'-dimethylbi-phenylenediisocyanate, 4,4'-biphenylenediisocyanate, durenediisocyanate, 1-phenoxy 2,4'-phenylenediisocyanate, 1-tert.-butyl-2,4-phenylenediisocyanate, methylene-bis-4,4' cyclohexyldiisocyanate, 1-chloro-2,4-phenylene diisocyanate and 4,4'-diphenyletherdiisocyanate.

It is also possible to use higher molecular weight and optionally also higher functional polyisocyanates which are produced from low molecular weight basic substances by polymerization reaction to form uretdions or isocyanurate derivatives. Let us mention for example the uretdion of 2 mol 2,4-toluylenediisocyanate and the polymerisation products, containing isocyanurate rings, of 2,4- and 2,6-toluylenediisocyanate or hexamethylenediisocyanate, a system containing on average 2 isocyanurate rings in the molecule and formed from 5 mol toluylenediisocyanate, or a corresponding derivative of on average 2 mol toluylenediisocyanate and 3 mol hexamethylenediisocyanate.

According to a further method it is possible to produce higher urea or biuret coupled systems from di- or polyisocyanates by partial hydrolysis through the stage of carbamic acid and the amine, e.g., a biuret coupled compound, formed theoretically from 3 mol hexamethylenediisocyanate with the addition of 1 mol water and the separation of 1 mol carbondioxide.

Other suitable substances containing isocyanate groups are obtained by the reaction of di- or poly-ols with di- or polyfunctional isocyanates, when the mol ratio of the hydroxy compound to the isocyanate is selected so that free NCO functions always remain present with the statistically formed reaction products and a molecular weight of 2000 to 3000 is not exceeded.

All the above described di- and polyisocyanates can be reacted in this way with di- and poly-ols, e.g., mono- and poly-ethyleneglycol, propane diols, butane diols, neopentylglycol and other pentane diols, adipol, hexane dioles, cyclohexane diols, 1,4-dihydroxymethylcyclohexane, perhydrobisphenol-A, glycerine, trimethylolethane, trimethylolpropane and other hexane triols and pentaerythrite under the described preconditions. The reactions of di- and poly-ols are preferred in which 1 mol of the diisocyanate is reacted per OH-function.

Eminently suitable isocyanate-containing substances for the formation of the heat sensitising agents according to the invention are also obtained if di- and polyisocyanates, such as all those described so far which are pure and also those formed by synthesis reactions, are reacted with monoalcoholic compounds in such a way that at least one isocyanate group per mol remains. All alcohols having from 1 to 30 C-atoms can be considered for use as monoalcohols. The functionality of the isocyanates used is lowered by this procedure, however this reaction using alcohols having more than 7 C-atoms enables the hydrophobia of the radical $R^1$ to be considerably augmented.

As already mentioned, the compounds containing isocyanates can be reacted either in free or masked form. For masking, phenols, acid amides, in particular caprolactam, oximes and enol compounds are used.

A variety of products can be used for the monohydroxy compounds which by reactions with the substances containing isocyanate lead to the heat sensitizing agents according to the invention. These include alkoxylates of alcohols, phenols carboxylic acids, carboxylic acid amides and sulphonamides.

Suitable alcohols include all saturated or unsaturated aliphatic and araliphatic hydroxy compounds having from 1 to 30 C-atoms, pure or in the form of mixtures by reduction of fatty acids or fatty acid esters, which can be obtained from vegetable oils such as coconut, peanut, palm, soya, linseed, maize or castor oil or from animal oils or fats, e.g., fish oil, whale oil, tallow, or pig fat or by oxosynthesis, the Ziegler process or by paraffin oxidation. The following examples should be mentioned here:

1-octanol, isooctanol, 2-ethyl-1-hexanol, 2-ethyl-4-methylpentanol-(1), 2,2-dimethyl-1-hexanol, 1-nonanol, trimethyl-1-hexanol (2,4,4, 3,5,5 and mixtures), 1-decanol, 1-dodecanol, iso-dodecanols, isotridecanol, 1-tetradecanol, 1-hexadecanol, isohexadecanol, 1-octadecanol, isooctadecanol, 3,3,5-trimethylcyclohexanol, 4-tert.-butylcyclohexanol, 2-hydroxydecalin, 1,7,7-trimethylnorbornanol-(2), oleylalcohol, eicosenylalcohol benzyl alcohol, 1- and 2- phenylethanol and 3-phenyl-1-propanol and 3-phenyl-1-propanol.

Mention should be made of the following phenols which can be used for the production of the alkoxylates: phenol, mono- and polyhalogenated phenols, naphthols, 2- and 4-hydroxydiphenyl, 3-benzene-4- hydroxydiphenyl, phenols alkylated with 1 to 15 C-atoms, e.g., cresols, ethyl phenols, but preferably phenols alkylated with 6 to 15 C-atoms, e.g., isooctylphenol, nonylphenols and dodecylphenols.

As alkoxylated acids, saturated and unsaturated aliphatic carboxylic acids having from 1 to 30 C-atoms, but preferably those with from 10 to 22 C-atoms can be used, such as capric acid, lauric acid, palmitic acid, stearic acid, behenic acid, ricinoleic acid, ricinic acid, linoleic acid or linolenic acid, or mixtures of saturated and/or unsaturated carboxylic acids which occur in paraffin oxidation and oxosynthesis or are obtained by the saponification of vegetable and animal fats. In addition, cycloaliphatic and aromatic carboxylic acids can be used for the alkoxylation, preferably with from 10 to 22 C-atoms, e.g., cyclohexane carboxylic acid, abietic acid, tert.-butyl benzoic acid and p-nonylbenzoic acid.

The carboxylic acid amides of the above described carboxylic acids in the preferred C-number range and alkylsulphonamides containing from 8 to 30 C-atoms can be used as the alkoxylatable acid amides.

To produce the alkoxylates, the compounds to be alkoxylated are reacted according to known processes with alkylene oxides. Alkylene oxides which can be used include for example ethylene oxide, propylene oxide, 1,2- and 2,3-epoxybutane, 2,3-epoxypentane, styrene oxide or epichlorohydrine, but preferably the first two mentioned. In the majority of cases only one alkylene oxide, namely ethylene oxide, is used. To increase the hydrophobia of the monohydroxy compound it is however sometimes advisable first to propoxylate the alkoxylatable compound and then subsequently to ethoxylate it. The number of alkoxy units present in the end product corresponds to the sum of the numbers x and y. In addition to the block polymerisation of the alkylene oxides a mix polymerisation is possible.

The monohydroxy compounds are reacted with the substances containing isocyanate in the manner known from the literature to form the heat sensitizing agents according to the invention. (Houben-Weyl, vol. 8. page 129 et seq. and vol. 14/2, page 57 et seq.). It is important for the production of reproducible products that the monohydroxy compounds are always used water free. The reaction can be carried out in inert solvents, e.g., benzene, toluene, xylene, chlorobenzene, O-dichlorobenzene, acetone and acetic acid ester or alternatively solvent-free at a lower or increased temperature, working preferably in a temperature range between 0° C. and 140° C. All catalysts effective in urethane formation (see Houben-Weyl, vol. 14, page 61), e.g., pyridine, methylpyridine N,N'-dimethyl-piperazine, N,N-dimethylbenzylamine or N,N'-endoethylenepiperazine, can be used. The monohydroxy compounds are preferably reacted with the isocyanates in the stoichiometric ratio. An excess of the monohydroxy compound is also possible, but as a rule, this procedure brings no advantages.

As already stated, it is possible, to produce higher molecular weight isocyanates from di- or polyisocyanates by partial reaction with water or with di- or poly-ols. In a preferred process for the production of the sensitizing agents according to the invention, di or polyisocyanates are first reacted with less than stoichiometric quantities of the monohydroxy compounds and then by reaction with stoichiometric quantities (relative to the isocyanate groups remaining free) of di- or poly-ols or water adjusted to a higher molecular weight. In the case of water, greater than stoichiometric quantities can be used to form higher molecular weight products, as the carbamic acid which is formed with water from isocyanates decarboxylates spontaneously and the primary amine produced is substantially more reactive than water relative to isocyanates. Therefore, preferably up to four times greater quantities of water can be used than is stoichiometrically necessary. With this procedure, in which first smaller quantities of the monohydroxy compound are reacted with the polyisocyanate and then in the described manner adjusted to a higher molecular weight, reaction ratios of isocyanate to diol, polyol or water are facilitated in which, if the procedure were reversed, the reaction of the di- and polyisocyanates with water, di- or polyols would produce highly latticed insoluble polymers.

Products of greatly varying molecular weights can be obtained by the above described production process. It has however proved that products with optimum efficacity lie in the molecular weight range above 1000.

The heat sensitising agents according to the invention are not only effective if they are soluble or even emulsifiable in water. It is also possible to make non-soluble products emulsifiable or soluble in water and thus usable in aqueous polymer latex by the addition of conventional anion or cation active or non-ionogenic emulsifiers. Substances which are insoluble in water or which are only sparingly soluble can also be made soluble through the dissolving intermediary of water soluble solvents, e.g., low, aliphatic di- and monohydroxy compounds such as methanol, ethanol, isopropanol, mono-, di- and triethyleneglycolmonomethyl- and ethyl-ether.

Suitable synthetic latices, which can be made heat sensitive with the substances according to the invention, are obtained by the polymerisation of conventional olefinic unsaturated monomers in aqueous emulsion. Such monomers include all radically polymerisable olefinic unsaturated compounds, e.g., mono and diolefins, such as ethylene, propylene, butadiene, isoprene, 2-chlorobutadiene-1,3,styrene, vinyltoluene, α-methylstyrene, chlorostyrene, vinylsulphonic acid and divinylbenzene, vinylhalides, such as vinyl chloride and vinylidene chloride, vinyl esters of straight chained or branched chained aliphatic carboxylic acids, such as vinyl acetate, propionate -n-butyrate, -pivalate, -laurate, and -stearate, vinyl ethers, such as vinyl methyl-, -ethyl-, -n-butyl- and sec. butylether, esters of the acrylic acid and methacrylic acid of mono- and polyols such as methyl acrylate and methacrylate, ethyl acrylate and methacrylate, butylacrylates and methacrylates, hexylacrylates and methacrylates, 2-ethylhexyl-acrylate and methacrylate, n-decylacrylate and methacrylate, n-dodecylmethacrylate, glycol-mono-acrylate and -methacrylate, butane diol 1,4-acrylate and methacrylate, ethylene glycol-bis-acrylate and methacrylate and trimethylpropane-tris-acrylate and methacrylate, diesters and semiesters of unsaturated dicarboxylic acids, such as maleic, fumaric and itaconic-di- and monomethyl-, ethyl, -ethyl-, -butyl- and hexylester, $\alpha,\beta$-unsaturated di- and mono- carboxylic acids, such as acrylic, methacrylic, crotonic, maleic, fumaric, and itaconic acid, amides, methlolamides and alkoxymethyl amides of these $\alpha,\beta$-unsaturated di- and monocarboxylic acids, such as acrylamide, methacrylamide, maleic acid amide, maleic acid imide, methylene-bis-acryl- and methacrylamide, N-methlolacryl and methacrylamide, N-methoxymethylacryl- and methacrylamide, allyl compounds, such as diallylphthalate and heterocyclic compounds, such as N-vinylphthalimide, N-vinylpyrrolidone and N-vinylimidazol. The monomers can be used alone or in combination with one another.

The polymerisation of the above monomers can be carried out in the presence of emulsifiers, and the conventional non-ionic or anionic emulsifying agents can be used alone or in combination with one another. The total quantity of emulsifier may be from 0.1 to 10% by weight relative to the monomers.

The emulsion polymerisation can be initiated with radical forming substances, preferably with organic peroxide compounds, used in quantities of from 0.1 to 2% by weight, relative to monomers. Depending on the monomer combination in order to lower the molecular weight of the polymer, small quantities of regulators can be used, e.g., mercaptanes, halogenated hydrocarbons. It is possible to effect the emulsion polymerization in two ways: the total quantity of the monomers and the greater part of the aqueous phase containing the emulsifiers can be prepared, polymerization can be started by the addition of the initiator and during polymerisation the rest of the aqueous phase can be added either continuously or at intervals. It is also possible to use the "monomer fee" technique, whereby only a part of the monomers and the aqueous phase containing the emulsifying agent is prepared and after the initiation of polymerization the rest of the monomers and the aqueous phase is added evenly or at intervals in accordance with the transformation. The monomer proportion added can be pre-emulsified in the aqueous phase. Both processes are known.

For the production of heat sensitive polymer dispersions natural rubber should be mentioned above all as an example of natural latices.

Dispersions of polymers produced using conventional emulsifying and dispersing agents, e.g., polyethylene, polyisobutylene, polyamide on a caprolactam base and on a hexamethylenediamine base and adipic acid can be considered for use as secondary dispersions.

The latices which can be made heat sensitive can be mixed with additive substances before or during processing. Thus acid separators, which are also added to the sensitizing agent, support the coagulatability by lowering the coagulation temperature. Other additives are, for example, dyes, pigments, fillers, thickeners, electrolytes, anti-aging agents water soluble resins or vulcanization chemicals.

The polymer latices, which generally have a polymer content of from 5–60% but particularly 20–50% by weight, are made heat sensitive by the addition of the compounds described in effective amounts, with quantities of from 0.01 to 10% by weight relative to the polymer being preferably used. The latices thus made heat sensitive prove to the very stable at room temperature in particular in relation to mechanical influences. The effect of the heat sensitizing agents according to the invention can be augmented still further by the addition of water-soluble amides of carbonic acid, thiocarbonic acid, carboxylic and thiocarboxylic acids containing from 1 to 5 C-atoms, which can be unsubstituted on the nitrogen atom or optionally substituted by one or two alkyl groups containing from 1 to 4 C-atoms, e.g., urea, thiourea, and acetamide. Mixtures of 90 to 10 percent by weight and preferably 70 to 30 percent by weight of the urethane group containing compounds according to the invention behave particularly well with 10 to 90% by weight, preferably 30 to 70% by weight of urea, thiourea and/or acetamide, thiourea being especially preferred.

Moreover, the effect of the heat sensitising agents according to the invention is increased if boric acid is added. Particularly effective mixtures are produced with this substance, consisting of 95–40% by weight preferably 95-70% by weight of the agents containing the urethane groups and 5 to 60% by weight, preferably 5-30% by weight of boric acid.

In a further embodiment, the compounds according to the application are combined with heat sensitising agents on a base of oxalkylated polysiloxanes. Suitable oxalkylated polysiloxanes are described in German Auslegeschriften Nos. 1,243,394 and 1,268,828 and in polysiloxanes are described in German Offenlegungsschriften Nos. 1,494,037 and 2,005,974. In order to obtain these oxalkylated polysiloxanes, first SiH-group containing linear siloxanes having from 3 to 20 Si atoms are produced by the hydrolysis of trimethylmonochlorosilane-monomethyldichlorosilane mixtures. Then allylglycidylether is added to the linear polysiloxane, and the polyepoxide group containing polysiloxane thus obtained is reacted preferably in the presence of an acid catalyst with monohydroxypolyethers, which in turn are obtained by alkoxylating $C_1$-$C_6$-alcohols with ethylene and/or propylene oxide. Suitable oxalkylated polysiloxanes are also obtained by reacting the monohydroxypolyethers, obtained by the alkoxylation of $C_1$-$C_6$ alcohols with ethylene- and propylene oxide, first with allylisocyanate and adding the allylurethanes obtained to the linear polysiloxane containing SiH groups.

A synergistic effect is seen in the mixtures of the heat sensitising agents according to the invention with these oxalkylated polysiloxanes.

Heat sensitizing mixtures used preferably consist of 90-30% by weight, more preferably 90-60% by weight of the compounds containing urethane groups according to the application and 5-70% by weight, more preferably 10-40% by weight of polysiloxanes.

The latex mixtures rendered heat sensitive according to the invention can, for example, be used for binding fibre fleece, made of synthetic or natural fibres, for example fibre fleece of cotton, staple fibre, wool, polyamides, polyesters, polyacrylnitrile, fibre glass, stone wool, asbestos wool or metal threads.

A heat coagulation of the latex mixture, which is possible after impregnation, prevents the migration of the polymers during subsequent drying. Thus an even distribution of the polymers over the whole area of the fleece is obtained.

The invention is illustrated by the following Examples.

EXAMPLE 1

Production of heat sensitizing agents.

(A) 198.7 g of a dehydrated oleylalcohol alkoxylated with 19 mol ethylene oxide per mol were heated in 300 ml toluene for 2 hours to reflux with 28.7 g of a biuret coupled trisocyanate (commercial product trademark Desmodur N, Bayer AG) theoretically produced from 3 mol hexamethylenediisocyanate by the addition of 1 mol water with the separation of 1 mol $CO_2$. When the toluene had been distilled off, a white wax-like product was obtained.

(B) 198 g of a dehydrated nonylphenol, alkoxylated with 20 mol ethylene oxide per mol, were heated to reflux for 2 hours with 28.7 g of a triisocyanate of example (A) in 300 ml of toluene. After the distillation of the solvent a white wax-like product was obtained.

(C) 113 g of a dehydrated nonylphenol, alkoxylated with 20 mol ethylene oxide per mol, were heated to reflux for 2 hours with 28.7 g of a triisocyanate of example (A) in 250 ml of toluene. Then 4 ml of water were added and the mixture was heated to reflux for a further hour. After the distillation of the toluene a very viscous, yellowish reaction product was obtained.

(D) 171.6 g of a dehydrated nonylphenol, alkoxylated with 20 mol ethylene oxide per mol and 0.74 g glycol, were heated to reflux for 2 hours with 28.7 g of a triisocyanate of example (A) in 250 ml toluene. After the solvent had been distilled off a very viscous, part crystalline, yellowish reaction product was obtained.

(E) 184.8 g of a dehydrated nonylphenol alkoxylated with 30 mol ethylene oxide per mol, were heated to reflux for 2 hours with 28.7 g of a triisocyanate of example (A) in 300 ml of toluene. After the solvent had been distilled off, a white wax-like product was obtained.

(F) 148.1 g of a dehydrated oleyl alcohol alkoxylated with 50 mol ethylene oxide per mol, were heated to reflux for 2 hours with 14.3 g of a triisocyanate of example (A) in 250 ml toluene. Then 3 ml of water were added and the mixture was again heated to reflux for one hour. After the toluene had been distilled off, a white wax-like reaction product was obtained.

(G) 220 g of a dehydrated nonylphenol alkoxylated with 20 mol ethylene oxide per mol, were heated to reflux for 2 hours with 17.4 g toluylene diisocyanate in 300 ml toluene. After the solvent had been distilled off a yellow, highly viscous, part crystalline product was obtained.

(H) 154 g of a dehydrated nonylphenol, alkoxylated with 20 mol ethylene oxide per mol, were heated to reflux for 2 hours with 17.4 g of toluylene diisocyanate in 300 ml toluene. After the toluene had been distilled off a dark yellow, highly viscous, part crystalline oil remains.

(I) 185 g of a dehydrated nonylphenol, alkoxylated with 30 mol ethylene oxide per mol, were heated to reflux for 2 hours with 10.4 g toluylenediisocyanate in 300 ml toluene. After the toluene had been distilled off a golden yellow, wax-like product was obtained.

(K) 176 g of a dehydrated oleyl alcohol alkoxylated with 19 mol ethylene oxide per mol, were refluxed for 2 hours with 69.6 g of a 50% solution of an isocyanate, formed from 5 mol toluylenediisocyanate forming two isocyanate rings in 300 ml toluene. After the distillation of the acetic acid ester and the toluene a golden yellow, wax-like product remained.

(L) 165 g of a dehydrated oleyl alcohol alkoxylated with 19 mol ethylene oxide per mol, were heated to reflux for 2 hours with 43.7 g of a triisocyanate, formed from 3 mol toluylenediisocyanate and trimethylpropane, in 300 ml toluene. After the distillation of the solvent a yellowish, wax-like product was obtained.

(M) 162 g of a dehydrated polyether, produced from 1 mol butanol, by ethyloxylation with 21.2 mol ethyleneoxide and subsequent propoxylation with 10.6 mol propylene oxide, having an OH number of 34.7, were reacted with 15.9 g of the isocyanate according to example (A) for 3 hours at 80°-90° C. After cooling a colorless fairly viscous oil was obtained.

EXAMPLE 2

To 210 g of an 47% aqueous dispersion of a copolymer produced in a conventional manner from 62 parts budadiene, 43 parts acrylonitrile and 4 parts methacrylic acid were added 70 g of an aqueous solution of the heat sensitising agent and 0.3 g of the Na salt of a $C_{12}$-$C_{18}$ alkylsulphonic acid (mersolate K 30) and the coagulation point of the mixture was measured after ½ hour standing time, after 1½ hours, after 2½ hours, after 1 day and after 7 days.

The coagulation point of the latex mixture was determined as follows. Approximately 10 g of the mixture rendered heat sensitive were weighed into a beaker and put into a water bath with a constant temperature of 80° C. While the mixture was being stirred evenly with a thermometer the coagulation behaviour and the temperature rise are recorded. The coagulation point of the mixture is the temperature at which a complete and definitive separation of polymer and aqueous phase occurs.

Table

| Heat sensitising agent | Quantity by weight of heat sensitising agent (g) | Coagulation (°C) after | | | | |
|---|---|---|---|---|---|---|
| | | ½ hour | 1½ hours | 2½ hrs | 1 day | 7 days |
| A | 3.0 | 61 | 61 | 61 | 62 | 64 |
| B | 5.0 | 42 | 42 | 42 | 42 | 42 |
|   | 4.0 | 46 | 46 | 47 | 47 | 47 |
|   | 3.0 | 53 | 53 | 53 | 54 | 56 |
| C | 1.5 | 38 | 38 | 39 | 39 | 38 |
|   | 1.0 | 42 | 42 | 43 | 43 | 43 |
| D | 3.0 | 47 | 47 | 47 | 47 | 47 |
| E | 3.0 | 56 | 56 | 56 | 56 | 56 |
| F | 3.0 | 57 | 57 | 57 | 58 | 56 |
| G | 3.0 | 64 | 63 | 63 | 64 | 61 |
| H | 3.0 | 57 | 57 | 57 | 58 | 57 |
| I | 3.0 | 59 | 61 | 61 | 61 | 61 |
| K | 3.0 | 48 | 48 | 48 | 48 | 45 |
| L | 3.0 | 54 | 54 | 54 | 54 | 57 |
| M | 3.0 | 59 | 59 | 59 | 59 | 59 |
| N | 3.0 | 46 | 45 | 45 | 44 | 43 |

EXAMPLE 3

210.0 parts by weight of a 47% latex of the copolymer comprising 62.0% by weight butadiene, 34.0% by weight acrylonitrile and 4.0% by weight methacrylic acid, 40.0 parts by weight of a vulcanization paste of
0.2 parts by weight colloidal sulphur
0.2 parts by weight zinc-N,N'-diethyldithiocarbamate
1.5 parts by weight zinc mercaptobenzthiazole
5.0 parts by weight zinc oxide
5.0 parts by weight titanium dioxide,
28.1 parts by weight of a 5% aqueous solution of a condensation product of naphthaline sulphonic acid with formaldehyde,
1.3 parts by weight of the heat sensitising agent according to example C,
0.25 parts by weight of boric acid,
75.0 parts by weight water.

The constituents listed were stirred together and the coagulation point of the latex mixture was determined by the method described in example 2. After a half hour's standing time it measured 39° C. and was constant over 7 days.

EXAMPLE 4

A heat sensitive mixture had the following composition:
200.0 parts by weight of a 50% latex of the copolymer of 62% by weight butadiene, 36.0% by weight acrylonitrile and 2.0% by weight methacrylic acid,
40.0 parts by weight of the vulcanization paste described in example 1;
0.55 parts by weight of the heat sensitizing agent according to example C,
0.03 parts by weight of an organopolysiloxane,
75.00 parts by weight of water.

The coagulation point of the mixture measured by the method described in example 2 was 44° C. and remained constant over several weeks.

EXAMPLE 5

For the production of a heat sensitive processable latex mixture the following constituents were stirred together:
250.0 parts by weight of a 40% latex of the copolymer comprising
  57.0% by weight butadiene, 36.0% by weight acrylonitrile,
  4.0% by weight methacrylamide, 1.0% by weight methacrylic acid and 2.0% by weight N-methlolacrylamide,
10.0 parts by weight of an aqueous 25% benzylphenylphenol solution,
0.7 parts by weight of the heat sensitising agent of example C.,
0.15 parts by weight of boric acid,
40.0 parts by weight of water.

The latex mixture had a coagulation point of 48° C. which was constant over several days. The measurement was again made under the conditions described in example 2.

EXAMPLE 6

200.0 parts by weight of a 50% latex of the copolymer of 60.0% by weight butadiene, 34.0% by weight acrylonitrile, 4.0% by weight methacrylic acid and 2.0% by weight styrene were mixed with
18.0 parts by weight of a vulcanisation paste of the following composition:
  2 parts by weight 2-mercaptobenzthiazol,
  0.2 parts by weight colloidal sulphur,
  5.0 parts by weight zinc oxide,
  10.8 parts by weight of a 5% aqueous solution of a condensation product of naphthaline sulphonic acid and formaldehyde,
3.7 parts by weight of the heat sensitizing agent of example C.,
3.7 parts by weight thiourea,
110.0 parts by weight water and the coagulation point was determined by the method described in example 2. The coagulation temperature which was constant over several days was 44° C.

EXAMPLE 7

170.0 parts by weight of a 58% latex of a polymer of 100% by weight chloroprene,
30.0 parts by weight of a vulcanisation paste of
  7.5 parts by weight zinc oxide,
  1.0 part by weight diphenylthiourea,
  1.0 part by weight diphenylguanadine,
  20.5 parts by weight of a 5% aqueous solution of a condensation product of naphthaline sulphonic acid and formaldehyde,
1.0 part by weight of the heat sensitising agent of example C,
110.0 parts by weight of water.

The latex mixture rendered heat sensitive had a coagulation temperature of 61° C.

We claim:

1. A method for coagulation of a polymer dispersion wherein a dispersion of a polymer selected from the group consisting of natural rubber latex and synthetic latices obtained by the polymerization of olefinic unsaturated monomers in aqueous solution is coagulated in the presence of a heat sensitizing agent of the formula

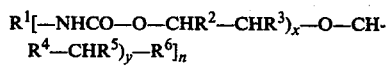

wherein
- $R^1$ is a member selected from the group consisting of saturated aliphatic hydrocarbon moiety having 1-18 carbon atoms and a valency equal to n, a saturated cycloaliphatic hydrocarbon having 5 to 6 carbon atoms and a valency equal to n, an aromatic hydrocarbon radical having 6-10 carbon atoms and a valency equal to n, said cycloaliphatic radical substituted by chlorine or alkyl having 1-4 carbon atoms and said aromatic radical substituted by chlorine or alkyl having 1-4 carbon atoms;
- n is a number from 1 to 20;
- $R^2$, $R^3$, $R^4$ and $R^5$ are independently of one another members selected from the group consisting of hydrogen, alkyl having 1-4 carbon atoms, chloromethyl and phenyl;
- x is a number from 1 to 100;
- y is a number from 0 to 50; and
- $R^6$ is a member selected from the group consisting of aryloxy, aralkoxy, alkaryloxy, alkanoyloxy, aroyloxy, alkylamido, alkylsulfonamido and alkoxy.

2. A method as claimed in claim 1 wherein $R^1$ is an alkyl with 1 to 18 carbon atoms, cycloalkyl with 5 to 6 ring carbon atoms, phenyl or naphthyl and $R^6$ is selected from the group consisting of alkoxy, alkanoyloxy, alkylamido, alkylsulfonamido, each having alkyl with 1-30 carbon atoms, phenoxy, naphthoxy, phenoxy substituted by alkyl having 1-4 carbon atoms, chlorine, alkoxy having 1-4 carbon atoms or hydroxy, aralkoxy having 6-15 alkyl carbon atoms and alkaryloxy having 6-15 alkyl carbon atoms.

3. A method as claimed in claim 2 wherein the hydrocarbon $R^1$ moiety additionally contains a moiety selected from the group consisting of urethane-, urea-, uretedion-, biuret- and isocyanuric acid ester.

4. A method as claimed in claim 1 wherein the heat sensitizing agent has the formula

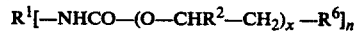

wherein
- $R^1$ is alkyl having 1-18 carbon atoms and contains one or more members selected from the group consisting of urea radical, biuret radical, cycloalkyl, aryl, cycloalkyl substituted by methyl groups, and aryl substituted by methyl groups;
- n is the number from 3 to 10;
- $R^2$ represents hydrogen or methyl;
- x represents a number from 5 to 50 and
- $R^6$ represents alkoxy having 8 to 20 carbon atoms, alkanoyloxy having 8 to 20 carbon atoms in the alkyl radical or alkylphenoxy with 6 to 15 carbon atoms in the alkyl radical.

5. A method as claimed in claim 1 wherein coagulation is carried out in the presence of an amide of an acid selected from the group consisting of carbonic acid, thiocarbonic acid, carboxylic acid and thiocarboxylic acids with the amide nitrogen atom being unsubstituted or substituted by at least one member selected from the group consisting of alkyl having 1-4 carbon atoms, boric acid, and an oxalkylated polysiloxane.

6. A method as claimed in claim 5 wherein the amide is selected from the group consisting of urea, thiourea, and acetamide.

* * * * *